United States Patent Office 3,126,360
Patented Mar. 24, 1964

3,126,360
POLYCONDENSATION CATALYSTS FOR IMPROVED PROCESS IN THE PRODUCTION OF POLYETHYLENE TEREPHTHALATE
Lothar Riehl, Obernburg (Main), Germany, assignor to Vereinigte Glanzstoff-Fabriken Aktiengesellschaft, Wuppertal-Elberfeld, Germany
No Drawing. Filed Sept. 20, 1960, Ser. No. 57,135
Claims priority, application Germany Sept. 23, 1959
15 Claims. (Cl. 260—75)

This invention relates to the use of certain catalysts in the polycondensation of diglycol terephthalate. In particular, the invention is concerned with the process whereby dimethyl terephthalate and ethylene glycol are first subjected to an ester interchange reaction or transesterification and the resulting diglycol terephthalate is then condensed to form a high molecular weight linear polyester of polyethylene terephthalate. The catalysts of this invention are employed to improve the second step of this reaction, i.e., polycondensation, both as an improvement of the process and as a means of obtaining improved polyester products.

The production of polyethylene glycol from dimethyl terephthalate and ethylene glycol as initial reactants is well known in the polymer art. In general, the preliminary ester interchange is carried out with these initial reactants at temperatures of about 140° C. to 260° C., preferably about 150° C. to 240° C. in order to obtain diglycol terephthalate as an intermediate. The diglycol terephthalate is then polycondensed at temperatures of about 230° C. to 290° C., preferably about 240° C. to 280° C., and it is possible to conduct both the ester interchange and polycondensation as a continuous or semi-continuous process. The two steps may overlap, although it is often advisable to substantially complete the ester interchange at temperatures about equal to or below the boiling point of ethylene glycol. Methanol is split off during the ester interchange and the end point of this first reaction is substantially attained when no further methanol is evolved. The presence of oxygen is always avoided in the steps of the process by working in an inert atmosphere such as nitrogen or under a vacuum.

It is also known that the two successively running reactions of ester interchange and polycondensation are generally favored by different catalysts. When the process was first developed, various metal-containing catalysts were employed in both steps of the process, and no value was placed upon distinguishing between these catalysts. Subsequent research indicated that some catalysts performed better for ester interchange while others gave the best results for polycondensation. For example, zinc acetate is one of the most common transesterification or ester interchange catalysts now employed while antimony trioxide has been found to be one of the best polycondensation catalysts among a number of inorganic salts or oxides.

Further studies in this field, however, have led to the conclusion that if the polycondensation catalyst is present during the ester interchange, it is almost always partially inactivated before polycondensation begins. It therefore became a practice to add the polycondensation catalyst at a later point of time, preferably after the ester interchange is completed, although this procedure causes some technical difficulties, especially in a continuous process.

Another difficulty arises in the use of antimony trioxide as the polycondensation catalyst, even though its catalytic properties are quite good when added after the ester interchange. The polyester product becomes discolored in the presence of this catalyst, apparently because of a reduction of the antimony trioxide to metallic antimony by compounds which are liberated in the reaction.

A principal object of the present invention is to provide more effective and improved catalysts for the polycondensation of glycol terephthalate to a high molecular weight polyethylene terephthalate.

Another object of the invention is to provide polycondensation catalysts which are at least as effective or better than antimony trioxide, and which will not lead to any objectionable discoloration of the final product. It is also an object to provide such catalysts which can be added prior to polycondensation and which will not lose their activity during ester interchange.

A further object of the invention is to provide polycondensation catalysts which will reduce the total time required for any desired degree of condensation as determined by the solution viscosity of the product.

Still another object of the invention is to provide catalysts which can be employed together with antimony trioxide to give an improved rate of condensation and at the same time to prevent discoloration normally caused by the antimony trioxide.

These and other objects and advantages of the invention will become more apparent in the following detailed description of the invention.

In accordance with the present invention, it has now been found that certain organic catalysts, when used alone or in combination with antimony trioxide or other known catalysts, will lead to significantly improved results in the polycondensation of diglycol terephthalate, especially in the overall process of first transesterifying dimethyl terephthalate with ethyleneglycol and then condensing the resulting diglycol terephthalate. The process of the invention is carried out under the usual conditions and with conventional apparatus, the improvement residing specifically in the use of the polycondensation catalysts described hereinafter.

The polycondensation catalysts of this invention are organic compounds, preferably with boiling points above about 100° C., selected from the class consisting of ketones, their oximes, and other closely associated compounds, including aromatic α-hydroxy-carboxylic acids and also aromatic compounds such as phenyl containing both a carboxyl and acetyl preferably substituted on adjacent carbon atoms, i.e. in ortho-position to each other. These latter compounds may also be considered as aryl esters of a saturated aliphatic carboxylic acid, these compounds being capable of conversion into ketones under certain conditions.

Where these catalytic compounds of the invention are capable of forming salts or esters, such as the oximes and carboxylic acids, the alkali metal salts and alkyl esters can also be used, preferably sodium and potassium salts and lower alkyl esters. The term "lower alkyl" is employed herein to include an alkyl radical containing about 1 to 4 carbon atoms.

Organic compounds of this class with relatively high melting points or boiling points are usually preferred, e.g. with boiling points above about 200° C., although there are some exceptions to this rule. In general, the catalyst will not be lost from the reaction system if its boiling point is sufficiently high, and with lower boiling compounds it is advisable to add a slight excess of the catalyst. Otherwise, the catalysts need be present in only very small amounts, e.g. about 0.01 to 0.1% by weight with reference to the initial dimethyl terephthalate reactant.

Suitable ketones as catalysts in the process of the invention include aliphatic, cycloaliphatic, and aromatic mono- and di-ketones. These ketones preferably contain at least 4 carbon atoms and at least one carbon atom contains the functional ketonic oxygen atom, as appears in the bivalent ketone group $>C=O$. The ketone group may thus appear in an aliphatic or cycloaliphatic chain or form a bridge between aliphatic and aromatic radicals, e.g. where attached to phenyl or furyl radicals. The 1.2-diketones are especially preferred together with their corresponding α-hydroxy-ketones and oximes. Closely related phenyl carboxylic acids are also suitable where the α-carbon atom contains an hydroxy or acetyl substituent, apparently because of the close relationship with α-hydroxy ketones where the carbonyl group >C=O is connected to an adjacent carbon atom substituted by hydroxy.

The above mentioned ketones may also contain other substituents in addition to the functional ketonic oxygen atom, e.g. lower alkyl, lower alkoxy, hydroxy and carboxyl groups, the carboxyl groups being present in their acid form or as lower alkyl esters or salts of alkali metals, especially sodium and potassium. Again, lower alkyl and lower alkoxy refer to radicals with about 1 to 4 carbon atoms. In cyclic compounds, and especially phenyl ketones, these substituents preferably stand in 3- or 4-position to the keto group. The hydroxy substituents are very often advantageously in the 1-position or α-position as noted above. In general, the ketones should contain only carbon, hydrogen and oxygen atoms, and any substituents should be inert to the reaction conditions and components. For this reason, the substituents of the ketone carbon atoms are preferably restricted to hydrogen, alkyl, alkoxy, hydroxy and carboxyl.

Of the class of compounds employed as polycondensation catalysts in the present invention, the following compounds have been found to be especially effective and are listed as being illustrative of the invention:

Benzil:

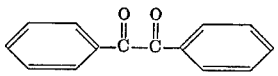

Furil:

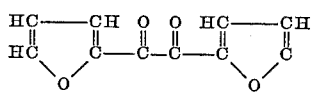

Anisil:

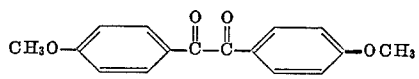

Benzvanillil:

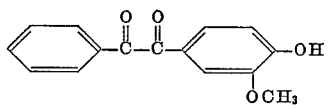

Biacetyl:

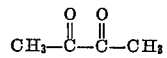

Benzoin:

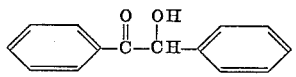

Furoin:

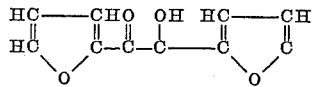

Salicoin:

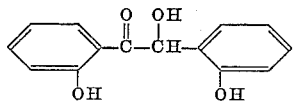

Benzfuroin:

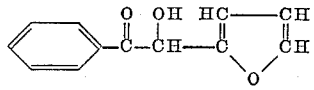

Benzildioxime:

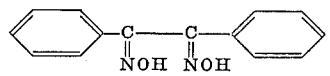

Sodium salt of biacetyl dioxime:

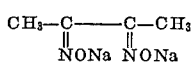

Benzsalicil:

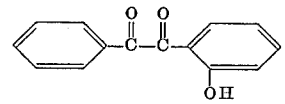

Acetophenone:

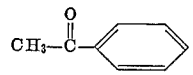

Benzophenone:

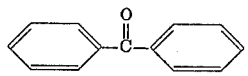

p-Benzoylbenzoic acid:

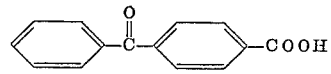

Fluorenone:

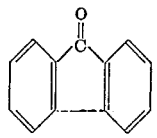

Methyl-isobutyl-ketone:

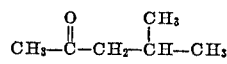

4-methylcyclohexanone:

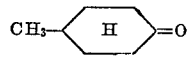

Dimedone:

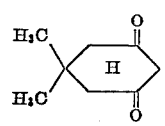

Ninhydrin (triketohydrindene or ninidrine):

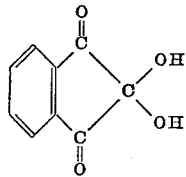

α-Cyclopentanone carboxylic acid and its ethyl ester:

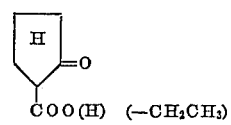

α-Cyclohexanone carboxylic acid and its sodium salt:

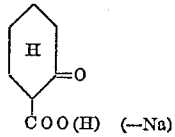

2-butylcyclohexanone:

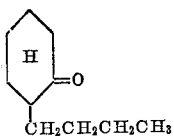

Benzilic acid or its potassium salt:

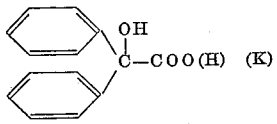

Mandelic acid or its potassium salt:

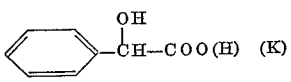

Acetylsalicylic acid or its potassium salt:

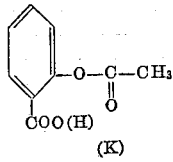

The following examples will further illustrate the invention, and it will be understood that the invention is not restricted solely to these examples. Percentages of materials in the examples are by weight, and the catalyst percentages are taken with reference to the dimethyl terephthalate reactant. The solution viscosity, softening point and degree of reflection of the polycondensate product are measured by conventional means.

COMPARATIVE EXAMPLE

In order to provide a comparison with the catalysts of the present invention, the following experiment was carried out using antimony trioxide as the catalyst for polycondensation.

(a) *Ester interchange.*—500 g. dimethyl terephthalate are melted under a nitrogen atmosphere in a flask and agitated with 344 ml. ethylene glycol and 75 mg. zinc acetate (0.015%). The temperature is then raised rapidly enough so that practically no ester is distilled over with the split-off methanol or glycol according to the following scheme: 1st hour, 160° to 200° C.; 2nd hour, 200° to 235° C.; 3rd hour, 235 to 240° C. On reaching a temperature of 240° C. (after a total of 3½ hours), 100 mg. antimony trioxide (0.02%) dispersed in a minimum of glycol, are added and 2500 mg. titanium dioxide (0.5%) as a 20% glycol dispersion are also added.

(b) *Polycondensation.*—Following step (a) and within a period of 60 minutes, the flask is brought to 0.1 mm. Hg vacuum with care to avoid spattering. The flask is also further heated so that by the time this vacuum is obtained, the interior temperature of the reaction mixture is just raised to 270° C. With additional gradual raising of the temperature to 276° C., the same vacuum is maintained until reaching the end point of the condensation as evidenced by a solution viscosity of $\eta_{rel}$=1.635 to 1.645.

The results of the comparative experiment as characteristics of the polymer can be summarized as follows:

Total condensation time from start of evacuation, hours _____ 4 to 4¼
Solution viscosity ($\eta_{rel}$) _____ 1.635 to 1.645
Softening point (° C.) _____ 260 to 261
Reflection at 460 mµ (percent) _____ 70 to 72

In Table I which follows, the results obtained with various catalysts of the invention are summarized. In all cases, the ester interchange and polycondensation are carried out in the same manner as in the above comparative example, except that the catalyst of the invention is substituted for antimony trioxide in the amount shown and the total condensation time from the start of evacuation is varied to give a polymer of substantially the same solution viscosity. The amount of the catalyst is in percent by weight with reference to dimethyl terephthalate as the initial reactant.

*Table I*

| Example | Catalyst | Amount | Total time of condensation (hrs.) | Solution viscosity (η rel.) | Softening temp., ° C. | Reflection, percent |
|---|---|---|---|---|---|---|
| 1 | Benzil | 0.02 | 3–3¼ | 1.63–1.64 | 260–261 | 78–79 |
| 2 | do | 0.01 | 3¼ | 1.63–1.64 | 260 | 78 |
| 3 | Furil | 0.02 | 3–3¼ | 1.63–1.64 | 260 | 76 |
| 4 | Benzsalicil | 0.02 | 3 | 1.65 | 260 | 70 |
| 5 | Benzfuril | 0.02 | 3½ | 1.630 | 260 | 75 |
| 6 | Benzvanillil | 0.02 | 3½ | 1.635 | 260 | 73 |
| 7 | Biacetyl | 0.02 | 3½–3¾ | 1.64 | 260 | 76 |
| 8 | Benzfuroin | 0.02 | 3½–3¾ | 1.64 | 260–261 | 72–73 |
| 9 | Salicoin | 0.025 | 3¼ | 1.65 | 260–261 | 70–71 |
| 10 | Biacetyldioxim | 0.02 | 3½–3¾ | 1.65–1.66 | 260–261 | 73 |
| 11 | Benzophenone | 0.02 | 3–3½ | 1.64–1.65 | 260–261 | 76–78 |
| 12 | Benzoylbenzoic acid | 0.02 | 3½–3¾ | 1.64 | 260–261 | 72–73 |
| 13 | Fluorenone | 0.02 | 3½ | 1.64 | 259–260 | 75–76 |
| 14 | Methylisobutylketone | 0.02 | 3¾ | 1.64 | 260 | 73 |
| 15 | 4-methylcyclohexanone | 0.02 | 3¼ | 1.65–1.66 | 260–261 | 76–78 |
| 16 | do | 0.03 | 3–3¼ | 1.65–1.66 | 261–262 | 77 |
| 17 | Dimedone | 0.02 | 2¾–3 | 1.65–1.66 | 260 | 74–75 |
| 18 | Ninhydrin | 0.02 | 3¾ | 1.64 | 260 | 73 |
| 19 | α-Cyclopentanone carboxylic acid ethyl ester | 0.02 | 3½ | 1.64 | 260 | 73–74 |
| 20 | α-Cyclohexanone carboxylic acid sodium salt | 0.02 | 3½–3¾ | 1.64 | 260–261 | 73–74 |
| 21 | 2-Butylcyclohexanone | 0.02 | 3¾ | 1.64 | 261–262 | 73–74 |
| 22 | Benzilic acid sodium salt | 0.02 | 3½ | 1.64 | 260–261 | 78–79 |
| 23 | Mandelic acid potassium salt | 0.02 | 3¾ | 1.64 | 261–262 | 73–74 |
| 24 | Acetylsalicylic acid | 0.02 | 3½–3¾ | 1.64–1.65 | 260–261 | 74–76 |

EXAMPLE 25

500 g. dimethyl terephthalate are melted under a nitrogen atmosphere in a flask and agitated with 344 ml. ethylene glycol and 75 mg. zinc acetate and also 100 mg. furil. Both the ester interchange and the condensation are then further carried out according to the data of the comparative example. The beginning of the condensation can be ascertained by the cessation of methanol splitting off, and the condensation is completed after 3 to 3½ hours. Summary:

Total condensation time figured from start of evacuation, hours _____ 3–3½
Solution viscosity ($\eta_{rel}$) _____ 1.64
Softening point (° C.) _____ 260
Reflection at 460 mµ (percent) _____ 79

The examples in the following table are carried out in accordance with Example 25:

also the condensation are then further carried out according to the data of the comparative example. The Table II

| Example | Catalyst | Amount | Total time of condensation (hrs.) | Solution viscosity (η rel.) | Softening temp.,°C. | Reflection, percent |
| --- | --- | --- | --- | --- | --- | --- |
| 26 | Anisil | 0.02 | 3¾ | 1.65 | 261 | 74 |
| 27 | Benzildioxime | 0.02 | 3½–3¾ | 1.65 | 261 | 73 |
| 28 | Furoin | 0.02 | 3–3¼ | 1.65 | 260–261 | 72–73 |

EXAMPLE 29

The ester interchange is carried out according to the comparative example. After completion of ester interchange, 50 mg. (0.01%) antimony trioxide and 50 mg. (0.01%) furil are added and the polycondensation is then carried out according to the comparative example.

Summary:

Total condensation time from start of evacuation, hours _____ 3½
Solvent viscosity ($\eta_{rel}$) _____ 1.65
Softening point (° C.) _____ 260
Reflection at 460 mμ (percent) _____ 74

The following table gives some additional examples carried out in the same manner as Example 29.

Table III

| Example | Catalyst | Amount | Total time of condensation (hrs.) | Solution viscosity (η rel.) | Softening temp., ° C. | Reflection, percent |
| --- | --- | --- | --- | --- | --- | --- |
| 30 | Benzil | 0.01 | 3½ | 1.64 | 260 | 78 |
| 31 | Benzoin | 0.01 | 3¼ | 1.65 | 261–262 | 74 |
| 32 | Furoin | 0.01 | 3–3¼ | 1.65 | 260–261 | 73–74 |

EXAMPLE 33

500 g. dimethyl terephthalate are melted under a nitrogen atmosphere in a flask and agitated with 344 ml. ethylene glycol and 75 mg. zinc acetate as well as 100 mg. benzophenone. Both the ester interchange and also the condensation are then further executed according to the data of the comparative example. The condensation—the beginning of which can be determined by the cessation of the methanol splitting off—is completed after 2¾ to 3 hours.

Summary:

Total condensation time from start of evacuation, hours _____ 2¾ to 3
Solution viscosity ($\eta_{rel}$) _____ 1.64
Softening point (° C.) _____ 259 to 260
Reflection at 460 mμ (percent) _____ 76 to 77

EXAMPLE 34

The ester interchange is carried out according to the comparative example. After completion of the ester interchange, 50 mg. (0.01%) antimony trioxide and 50 mg. (0.01%) acetophenone are added and the polycondensation is carried out according to the comparative example.

Summary:

Total condensation time from start of evacuation, hours _____ 3½
Solution viscosity ($\eta_{rel}$) _____ 1.65
Softening point (° C.) _____ 260
Reflection at 460 mμ (percent) _____ 72 to 74

EXAMPLE 35

500 g. dimethyl terephthalate are melted under a nitrogen atmosphere in a flask and agitated with 344 ml. ethylene glycol and 75 mg. zinc acetate as well as 100 mg. 4-methylcyclohexanone. Both the ester interchange and also the condensation are then further carried out according to the data of the comparative example. The condensation—the beginning of which can be determined by the cessation of methanol splitting off—is completed after 3¼ to 3½ hours.

Summary:

Total condensation time from start of evacuation, hours _____ 3¼ to 3½
Solution viscosity ($\eta_{rel}$) _____ 1.64
Softening point (° C.) _____ 260 to 261
Reflection at 460 mμ (percent) _____ 75 to 77

EXAMPLE 36

The ester interchange is carried out according to the comparative example. After completion of ester interchange, 50 mg. (0.01%) antimony trioxide and 50 mg. (0.01%) 4-methylcyclohexanone are added and the polycondensation is carried out according to the comparative example.

Summary:

Total condensation time from start of evacuation, hours _____ 3 to 3¼
Solution viscosity ($\eta_{rel}$) _____ 1.64
Softening point (° C.) _____ 260 to 261
Reflection at 460 mμ (percent) _____ 74 to 75

EXAMPLE 37

The ester interchange is carried out according to the comparative example. After completion of ester interchange, 50 mg. (0.01%) antimony trioxide and 50 mg. (0.01%) of the potassium salt of benzilic acid are added and the polycondensation is carried out according to the comparative example.

Summary:

Total condensation time from start of evacuation, hours _____ 3½ to 3¾
Solution viscosity ($\eta_{rel}$) _____ 1.64 to 1.65
Softening point (° C.) _____ 260 to 261
Reflection at 460 mμ (percent) _____ 72 to 73

From the foregoing examples, it will be recognized that the polycondensation catalyst of the invention provide a substantial brightening or whitening effect on the final condensation product having about the same physical characteristics in other respects. This result appears to be due to the fact that the catalysts of the invention are organic compounds and contain no metal atoms which are reduced during the process so as to cause discoloration of the polycondensation product. However, the catalysts of the invention can also be used in combination with antimony trioxide and appear to act as a stabilizer or decolorizing agent, because the normal graying or yellowing tendencies of antimony trioxide are substantially diminished or nullified. This effect can possibly be explained as a reaction between the organic catalyst and catalyst residues present in finely dispersed metallic form, e.g. as zinc and antimony. It is believed that this reaction recombines and reactivates the metal as a catalyst with an accompanying dissolution in the condensate mass. Decoloration would then occur by recombining the free metals.

The catalysts of the present invention also provide a substantial reduction in the usual time of about 4 hours or more required for condensation to a fiber-forming polymer. Most of the catalyst reduces the condensation time by at least one-half hour and in many instances by an hour or more. This reduction of the condensation time is also quite noticeable when the catalysts of the invention are used in combination with antimony trioxide.

The production of polyethylene terephthalate is accomplished more economically and with less difficulty because of the very active catalysts described hereinabove. These catalyst can be added before or during ester interchange, together with transesterification catalysts, without losing their improved activity. Valuable polycondensation products are obtained from the process when using these catalysts, the products having a clearer and brighter appearance by comparison with condensates obtained with the use of known catalyst of high activity.

The invention is hereby claimed as follows:

1. A process for the production of polyethylene terephthalate which comprises: carrying out an ester interchange between dimethyl terephthalate and ethylene glycol; and polycondensing the resulting diglycol terephthalate in the presence of a polycondensation catalyst selected from the group consisting of benzil, furil, benzfuril, anisil, benzvanillil, biacetyl, benzoin, furoin, salicoin, benzfuroin, benzildioxime and its alkali metal salts, biacetyl dioxime and its alkali metal salts, benzsalicil, acetophenone, benzophenone, fluorenone, methyl-isobutyl-ketone, 4-methylcyclohexanone, dimedone, ninhydrin, α-cyclopentanone carboxylic acid and its ethyl ester, α-cyclohexanone carboxylic acid and its alkali metal salts, 2-butylcyclohexanone benzilic acid and its alkali metal salts, mandelic acid and its alkali metal salts, and acetylsalicylic acid and its alkali metal salts.

2. A process as claimed in claim 1 wherein the polycondensation catalyst is added to the reaction after substantial completion of said ester interchange.

3. A process as claimed in claim 1 wherein the polycondensation catalyst is added to the reaction before commencing said ester interchange.

4. A process as claimed in claim 1 in which said polycondensation catalyst is employed in an amount of about 0.01 to 0.1% by weight with reference to dimethyl terephthalate.

5. A process as claimed in claim 1 wherein said polycondensation catalyst is employed together with antimony trioxide in approximately equal amounts by weight.

6. A process as claimed in claim 1 wherein the polycondensation catalyst is benzil.

7. A process as claimed in claim 1 wherein the polycondensation catalyst is furil.

8. A process as claimed in claim 1 wherein the polycondensation catalyst is benzfuril.

9. A process as claimed in claim 1 wherein the polycondensation catalyst is biacetyl.

10. A process as claimed in claim 1 wherein the polycondensation catalyst is benzophenone.

11. A process as claimed in claim 1 wherein the polycondensation catalyst is fluorenone.

12. A process as claimed in claim 1 wherein the polycondensation catalyst is 4-methylcyclohexanone.

13. A process as claimed in claim 1 wherein the polycondensation catalyst is dimedone.

14. A process as claimed in claim 1 wherein the polycondensation catalyst is an alkali metal salt of benzilic acid.

15. A process as claimed in claim 1 wherein the polycondensation catalyst is acetylsalicylic acid.

References Cited in the file of this patent

UNITED STATES PATENTS

| | | |
|---|---|---|
| 2,437,232 | Rothrock | Mar. 2, 1948 |
| 2,857,363 | Easley et al. | Oct. 21, 1958 |
| 2,890,205 | Howells | June 9, 1959 |
| 2,951,060 | Billica | Aug. 30, 1960 |

FOREIGN PATENTS

| | | |
|---|---|---|
| 728,550 | Great Britain | Apr. 20, 1955 |